Patented Apr. 18, 1944

2,346,921

UNITED STATES PATENT OFFICE 2,346,921

HYDROGENATED PRODUCT

Irvin W. Humphrey, Wilmington, Del., assignor to Hercules Powder Company, Wilmington, Del., a corporation of Delaware No Drawing. Original application February 8, 1941, Serial No. 378,059. Divided and this application February 9, 1943, Serial No. 475,275

13 Claims. (Cl. 260—100)

This invention relates to the preparation of hydrogenated polymerized rosin and hydrogenated polymerized rosin esters.

Polymerized rosin and polymerized rosin esters are known but these products are not desirably resistant to various deteriorating influences such as oxidation, light, heat, aging, abrasion, etc., do not have a desirably high melting point for use in many fields and otherwise are not entirely satisfactory.

It is an object of the present invention to prepare derivatives of polymerized rosin and its esters which, to a large extent, are free from the foregoing disadvantages. Another object is to prepare hydrogenated polymerized rosin and hydrogenated polymerized rosin esters. Another object is to devise a process for the preparation of such products. Still other objects will hereinafter appear.

I have discovered that the foregoing objects may in general be accomplished by hydrogenating polymerized rosin and polymerized rosin esters. In this way, the unsaturation of the molecule, the tendency to deteriorate or oxidize, and the instability of the products, are markedly decreased.

As raw materials, I may use any type of polymerized rosin or polymerized rosin ester. Usually the invention will be applied to polymerized rosin and to polymerized rosin esters which are only partially polymerized, i. e., which contain from about 5% to about 50% of completely polymerized rosin. The completely polymerized rosin, which is apparently a dimer, is however operable and may be hydrogenated. Also polymerized rosin containing up to about 90% of the dimer may be hydrogenated. The invention may be applied to polymerized wood rosin or polymerized gum rosin. Polymerized rosin acids such as polymerized abietic acid, pimaric acid, sapinic acid, or mixtures thereof, and dimers thereof, etc., may be employed as the raw material. The rosin prior to or after polymerization or both may have been purified or refined by any of a large number of methods. For instance, it may have been heat treated, vacuo distilled, selective solvent refined, fractionated, adsorbent refined, etc. The polymerized rosin may have been prepared by any of the known processes for polymerizing rosin. Thus, it may have been polymerized with sulfuric acid, alkyl sulfuric acids, acyl sulfuric acids, hydrogen fluoride, phosphoric acid, tetraphosphoric acid, boron trifluoride, organic acid and organic ester complexes of boron trifluoride, fluoboric acid, amphoteric metal chlorides such as aluminum chloride, stannic chloride, zinc chloride, etc.

Polymerized rosin esters prepared by polymerizing rosin esters or esters of rosin acids with any of the foregoing polymerizing catalysts may be hydrogenated in accordance with the present invention. Alternatively, the polymerized rosin esters employed as the starting material in the present invention may have been prepared by esterifying polymerized rosin with alcohols in known manner. Also the polymerized rosin may be hydrogenated and then esterified. The polymerized rosin esters with polyhydric alcohols such as glycerine, diglycerine, pentaerythritol, dipentaerythritol, sorbitol; ethylene, propylene, diethylene, dibutylene, dipropylene glycols, etc., mixtures of polyhydric alcohols, or with monohydric alcohols such as methyl alcohol, ethyl alcohol, propyl alcohol, butyl alcohol, furfuryl, tetrahydrofurfuryl alcohol, benzyl alcohol, etc., may be employed as starting materials in the present invention. The polymerized rosin esters may likewise have been refined or fractionated in known manner such as treatment with selective solvents such as furfural, phenol, etc., adsorbents such as fullers' earth, activated carbon, Filter-Cel, etc., either prior to or after polymerization, or both.

The raw material, that is the polymerized rosin and the polymerized rosin esters, may have been subjected to heat treatment following polymerization at a temperature within the range of from about 250° C. to about 350° C. and preferably from about 275° C. to about 325° C. for periods of time of from about 5 minutes or less to about 1 hour or more. The heat treatment is desirably carried out using an inert atmosphere such as $CO_2$, $H_2$, $N_2$, steam, etc. The polymerized rosin or rosin ester may be heat treated, hydrogenated and then partly distilled under reduced pressure; also heat treated, partly distilled under reduced pressure to remove low ends and the residue hydrogenated.

The polymerized rosin or polymerized rosin ester may also have been subjected to hydrolysis with aqueous acid during its preparation, in order to decompose traces of organic sulfates or phosphates which often contaminate the final product. Preferably, this hydrolysis is carried out immediately following polymerization and prior to the heat treating step just referred to.

Polymerized rosin having an increase in melting point (Hercules drop method) of from about 5° C. to about 100° C. over that of the original rosin may be used in the present invention. Polymerized rosin esters having similar increases in melting point may be employed. Polymerized rosin having no appreciable change in acid number over that of the original rosin or polymerized rosin having a reduced acid number, for example, in which the reduction in acid number is as much as 40% or more, is operable.

The raw material may also have been partially distilled in vacuo to free it from oils and other light ends. In the case of polymerized rosin, vacuo distillation of the material, either prior to or after hydrogenation, may result in the removal of monomeric constituents in addition to oils formed in the polymerization. In the case of some of the polymerized rosin esters, the monomeric constituents which are volatile in vacuo may be removed by this means either before or after hydrogenation. Thus, methyl, ethyl, and butyl esters of rosin or rosin acids may be removed from the polymerized rosin esters in addition to oils formed in the polymerization by vacuo distillation. However, glycol and glycerol esters of rosin cannot be removed from the corresponding polymerized rosin esters because they are not sufficiently volatile in vacuo.

The hydrogenation of the polymerized rosin or polymerized rosin ester is preferably carried out in any suitable known manner, for example, using a hydrogenation catalyst and a solvent for the resinous raw material.

The use of an inert solvent for the polymerized material during the hydrogenation is generally desirable since it reduces the viscosity of the reaction mixture and brings about improved contact with the catalyst. The solvent may be polar or non-polar. Suitable solvents are saturated petroleum hydrocarbons, completely saturated acyclic hydrocarbons such as cyclohexane, decahydronaphthalene, etc., ethers such as ethyl ether, isopropyl ether, etc., organic acids such as glacial acetic acid, etc., esters such as ethyl acetate or butyl acetate, alcohols such as methyl alcohol, ethyl alcohol, butyl alcohol, etc. Organic acids such as glacial acetic acid are suitable only where noble metal catalysts are employed, since they attack base metal catalysts.

The amount of solvent employed may vary within wide limits, depending upon the hydrogenation conditions employed. The amount of solvent may be such as to give a solution containing from about 5% to about 70% by weight of the polymerized rosin or polymerized rosin ester to be hydrogenated.

Any suitable hydrogenation catalyst prepared according to the known art may be employed. Catalysts such as activated nickel, Raney nickel, active nickel oxide, copper chromite, activated platinum, platinum oxide, active palladium, palladium oxide, active rhodium, rhodium oxide, etc. are operable. If desired, the catalysts may be supported on a suitable inert material such as silica gel, alumina, pumice, diatomaceous earth, activated carbon, quartzes, etc.

In addition, special noble metal oxide hydrogenation catalysts are suitable for use in the present invention. These consist of noble metal oxides deposited on an inert non-porous granular support whose particle size is less than 10 microns, and whose edges are rounded. Preparation of these catalysts is disclosed in patent applications, Serial Nos. 370,797; 370,798; 370,799; and 370,800 of W. J. Kirkpatrick, filed December 19, 1940.

In addition, a supported platinum oxide catalyst prepared according to U. S. 2,207,868 to Martin is suitable in the present invention.

The amount of catalyst may vary widely depending upon the specific catalyst employed and the hydrogenation conditions. Generally speaking, from about 1% to about 25% by weight of catalyst based on the weight of polymerized rosin or polymerized rosin ester will be suitable.

The temperature at which the hydrogenation is conducted may range from about 20° C. to about 230° C. or somewhat higher, depending upon the catalyst and the degree of hydrogenation desired. The time of hydrogenation may vary from about 15 minutes to about 10 hours likewise depending upon the catalyst, temperature, and degree of hydrogenation desired. The pressure of hydrogen may range from about 15 to about 8000 lbs. per square inch. Using base metal catalysts such as active nickel or its oxide, or copper chromite, the preferable ranges are from about 125° C. to about 225° C. and from about 250 to about 5000 lbs. per square inch. Using noble metal catalysts such as platinum or palladium, rhodium, or their oxides, the preferred range of hydrogenation pressure is from about 15 to about 100 lbs. per square inch and the preferred temperature range from about 25° C. to about 100° C. The hydrogenation may be carried out either in a batchwise manner or in a continuous manner such as is shown in U. S. 2,094,117.

Following the desired extent of hydrogen absorption, the catalyst is filtered from the reaction mixture and the solvent removed by distillation preferably in vacuo. If no solvent is present, the reaction mixture may desirably be filtered while hot in order to remove the catalyst.

The products are useful generally wherever polymerized rosin and polymerized rosin esters having an increased resistance to oxidation, a decreased tendency towards crystallization, and a decreased tendency towards discoloration are desired, for example, in plastics and in protective coatings. In addition, hydrogenated polymerized rosin and polymerized rosin esters frequently present an improvement over the ordinary unhydrogenated materials since higher melting points are frequently brought about by the hydrogenation. In addition, the products of the present invention may display an improved resistance to abrasion when employed as resinous binders in the plastic and protective coating field.

It is preferred to conduct the hydrogenation in such manner that the reaction mixture is essentially free from ingredients which would poison the catalyst. For example, it has been found that some sulfuric acid polymerized rosins and polymerized rosin esters do not readily hydrogenate using certain catalysts. Thus, polymerized rosin which has been heat treated and then bleached by nascent hydrogen by treatment with zinc and sodium bisulfate does not readily hydrogenate using noble metal and nickel catalysts. It is probable that the combined sulfur present in the zinc-sodium bisulfate bleached material is of the mercaptan or sulfide type which is known to poison noble metal catalysts much as platinum and base metal such as nickel hydrogenation catalysts. This objectionable type of combined sulfur is apparently not present in sulfuric acid polymerized rosins prepared without this zinc sodium bisulfate bleaching step. On the contrary, the sulfur present in regular sulfuric acid polymerized rosin and polymerized rosin esters exerts no appreciable poisoning effect upon the catalyst even when the same catalyst is re-used for a number of additional hydrogenations. The reduction in sulfur content of the polymerized raw material by the steps of hydrolysis with acid followed by heat treatment has no appreciable effect upon the degree of hydrogenation achieved making it apparent that the form of sulfur in such material does not poison the catalyst. In addition to mercaptan and sulfide poisons, I have found that lead is an active poison for the catalyst particularly where a platinum catalyst is employed. Thus, in Example 29 below the presence of even a trace of lead probably derived from the equipment employed in the manufacture of the particular polymerized rosin used as a starting material in that example caused an objectionable poisoning of the catalyst.

Following are specific examples showing the invention in practice. The parts and percentages are by weight. In each of the examples showing polymerization, with the exception of Example 9 wherein ethylene dichloride was the solvent so that no sludge formed, the sludge layer was separated from the solution layer after the polymerization reaction. In the examples describing hydrogenation, the pressures are in pounds per square inch, and the melting points were determined by the Hercules drop method.

Example 1

Seventy parts of 95% $H_2SO_4$ was added to a solution of 260 parts of K wood rosin in 600 parts of benzene while agitating at 11–15° C. during 12 minutes. Agitation at 15° C. was continued for about 35 minutes, and the mixture was then allowed to stand 15 minutes for separation of sludge. The benzene solution was decanted from the sludge and shaken with 100 parts of water. The entire resulting mixture (including the aqueous acid) was agitated vigorously at 85° C. for one hour under reflux. This hydrolysis step caused decomposition of polymerized rosin sulfates. The mixture was then allowed to undergo layer formation and the lower spent acid layer was separated. The benzene solution was washed consecutively with 3 lots of 1000 parts each of tap water at 20–30° C. Solvent was removed by vacuo distillation with a final bath temperature of 220° C., and a pressure of about 20 mm. The product had an acid number of 166, melting point of 98° C., sulfur content of 0.006, and a color of M.

Example 2

Fifty parts of the product of Example 1 was dissolved in a mixture of 150 parts of glacial acetic acid and 4 parts of water. To the mixture there was added 5 parts of an activated platinum hydrogenation catalyst. Hydrogenation was carried out at 28–55 lbs. hydrogen pressure at 25–40° C. for 2 hours. Approximately 0.8% of hydrogen was absorbed on the weight of the polymerized rosin. The catalyst was filtered off and the solvent removed by vacuo distillation. The product had an acid number of 169, a melting point of 100° C. and a color of N+ on the rosin scale.

Example 3

The polymerization procedure of Example 1 was duplicated exactly except that the hydrolysis step was omitted. The product analyzed: acid number 158, melting point 104° C., color K, 0.015% S.

Example 4

The product of Example 3 was hydrogenated exactly as in Example 2 except that the time of hydrogenation was one-half hour and the hydrogen pressure range 43–55 lbs. The hydrogen absorption was 0.57% based on the weight of the polymerized rosin. The product had a color of N+. Under the same conditions N wood rosin absorbed 0.936% of hydrogen.

Example 5

To 400 parts of WG gum rosin dissolved in 144 parts of narrow range gasoline (B. P. 90–130° C.) was added 100 parts of 85% $H_2SO_4$ during one-half hour at 30–32° C. Agitation at 30–32° C. was continued for 1.5 hours. The reaction mixture was then poured into 680 parts of the narrow range gasoline with vigorous agitation. The gasoline solution was decanted from the sludge and divided into equal portions.

One-half of the gasoline solution was subjected to hydrolysis by vigorously agitating it with 100 parts of aqueous 10% $H_2SO_4$ for one hour at 80° C., then separated from the aqueous acid and water washed with three 1000 part lots of water at 25–30° C., containing 2.5% of sodium chloride. The washed solution was then evaporated as previously. The resinous residue was heat treated at 270–280° C. for 12 minutes using a carbon dioxide sparge, then cooled to 180° C. under carbon dioxide, and poured from the heat treating vessel. The product had an acid number of 151, a melting point of 114° C. a color of WW, and a sulfur content of 0.005.

Example 6

The product of Example 5 was hydrogenated exactly as in Example 2 except that the time of hydrogenation was 0.5 hour and the hydrogen pressure range was 52–58 lbs. The hydrogen absorption was 0.61%. The product had a color of K, an acid number of 145, and a melting point of 120° C.

Example 7

The other half of the gasoline solution of Example 5 was directly washed, without hydrolysis, with three 1000 part lots of water at 25–30° C. containing 2.5% of sodium chloride, and then evaporated to remove the gasoline. The residue was heat treated at 270–280° C. for 12 minutes using a carbon dioxide sparge, then cooled to 180° C. under carbon dioxide before pouring. The product had an acid number of 151, a color of WW, a melting point of 114° C., and a sulfur content of 0.042.

Example 8

The product of Example 7 was hydrogenated as in Example 2 except that the time was 0.5 hour and the pressure 52–58 lbs. The hydrogen absorption was 0.32 and the product had a color of K.

Example 9

To a solution of 900 parts of N wood rosin in 1650 parts of ethylene dichloride there was added 150 parts of 95% $H_2SO_4$ during 15 minutes with agitation at 15–20° C. Agitation at 15–20° C. was continued for 15 minutes. The reaction mixture was divided into two equal portions.

To one-half of the reaction mixture there was added 700 parts of aqueous 50% $H_2SO_4$ and the mixture agitated for one hour at 85° C. under reflux for hydrolysis. The solution was separated from the aqueous acid and washed with three 2000 part lots of water at 50° C. The solvent was then evaporated from the washed solution. The residue was heat treated at 280° C. for 12 minutes under $CO_2$ and then cooled to 180° C. under $CO_2$ before pouring. The product had an acid number of 154, a melting point of 116° C., a color of K+, and a sulfur content of 0.012%.

Example 10

The product of Example 9 was hydrogenated as in Example 2 except that the time was 0.5 hours and the pressure range 50–58 lbs. The product had an acid number of 155, a melting point of 130, and a color of G. The hydrogen absorption was 0.36%.

Example 11

The other half of the reaction mixture of Example 9 was washed directly with water and evaporated as before. The residue was heat treated at 280° C. for 12 minutes using a $CO_2$ sparge, and cooled to 180° C. under $CO_2$ before pouring. The product had an acid number of 151, a melting point of 123° C., a color of N and a sulfur content of 0.013%.

Example 12

The product of Example 11 was hydrogenated as in Example 2 except that the time was 0.5 hour and the pressure range 50–58 lbs. The product had an acid number of 156, a melting point of 138° C. and a color of H. The hydrogen absorption was 0.35%.

Example 13

A 35% solution of K wood rosin in benzene was polymerized with $H_2SO_4$ in a continuous polymerization unit. The contact time was about 3½ hours at 15° C. About 14% by weight of 95% $H_2SO_4$ was used on the weight of the rosin. The polymerized rosin solution was subjected to hydrolysis with aqueous 10% $H_2SO_4$ at 80–90° C. for a period of 0.5 hour. The benzene solution was then water washed and evaporated as before. The product had an acid number of 156, a melting point of 98.5° C., a color of K, and a sulfur content of 0.008%.

Example 14

The product of Example 13 was hydrogenated as in Example 2 except that the time was 0.5 hour and the pressure range 49–58 lbs. The hydrogen absorption was 0.46%. The product had an acid number of 151, a melting point of 118° C., and a color of N+.

Example 15

The product of Example 13 was subjected to heat treatment at 270–280° C. for 12 minutes while sparging with $CO_2$. The product had an acid number of 145, a melting point of 98.5° C., a color of N, and a sulfur content of 0.005%.

Example 16

The product of Example 15 was hydrogenated as in Example 2 except that the time was 0.5 hour and the pressure range 49–58 lbs. The product had an acid number of 152, a melting point of 117° C., and a color of N. The hydrogen absorption was 0.45%.

Example 17

One hundred and twenty parts of the polymerized rosin obtained in Example 9 before the heat treatment was heated with 14.4 parts of glycerine at 270° C. for 5.5 hours in an atmosphere of carbon dioxide. The mixture was then sparged with carbon dioxide at 270° C. for ¾ hour, cooled under carbon dioxide to 200° C., and poured. The product had an acid number of 8, a melting point of 119° C., a color of K and a sulfur content of 0.005%.

Example 18

The polymerized rosin glycerine ester of Example 17 was hydrogenated in a solution of 50% glacial acetic acid and 50% of cyclohexanol, at 54–55 lbs. pressure for 0.5 hour at 25–30° C., using a platinum catalyst. In that time 0.12% of hydrogen was absorbed. The product had an acid number of 6.8, a melting point of 123° C., and a color of N. The hydrogenation was continued until the total time of hydrogenation was 4 hours. The total hydrogen absorption was 0.16%.

Example 19

K wood rosin was polymerized as in Example 13 except that the contact time was 1.2 hours. The product was hydrolyzed as in Example 13. The product had an acid number of 145, a melting point of 99° C., a color of N, and a sulfur content of 0.008%.

Example 20

The product of Example 19 was hydrogenated as in Example 2 except that the time was 0.5 hour and the hydrogen pressure range 46–58 lbs. The product had an acid number of 147, a melting point of 106° C., and a color of G. The hydrogen absorption was 0.79%.

Example 21

The product of Example 19 was hydrogenated using Raney nickel as catalyst, di-isopropyl ether as the solvent, a temperature of 150° C., a pressure of 1600–2500 lbs. per square inch and for a period of 18 hours. Seventy-five parts of the resinous product, 15 parts of catalyst, and 75 parts of di-isopropyl ether were used. The catalyst was filtered off, and the solvent removed from the filtrate by vacuo distillation. The product had an acid number of 138, a melting point of 104° C. and a color of WW. The hydrogen absorption in this run was 0.63%.

Example 22

To a solution of 1200 parts of K wood rosin in 2200 parts of benzene at 15–20° C., there was added 300 parts of 95% $H_2SO_4$ during 25 minutes with agitation. Agitation at 15–20° C. was continued for 40 minutes, and the mixture was then allowed to stand for 15 minutes, and the benzene solution was divided into two equal portions.

To one portion there was added 300 parts of aqueous 10% $H_2SO_4$ and the mixture agitated under reflux for one hour at 80–90° C. This effected hydrolysis. The aqueous acid was separated and the solution washed with three 2000 part lots of water at 50° C. The washed solution was then evaporated. The resinous residue was heat treated at 280° C. for 12 minutes, using a $CO_2$ sparge. The product had an acid number of 149, a melting point of 111° C., a color of WG, and a sulfur content of 0.002%.

Example 23

The product of Example 22 was hydrogenated using Raney nickel as a catalyst and isopropyl ether as the solvent at 180° C. for 15 hours at 1600–2500 lbs. per square inch. The proportions were: polymerized rosin 50 parts, catalyst 10 parts, isopropyl ether 150 parts. The product had an acid number of 155, a melting point of 116° C. and a color of M. The hydrogen adsorption was 0.95%.

Example 24

The other portion of the benzene solution of

Example 22 was washed directly with three 2000 part lots of water at 50° C. and then evaporated to recover the polymerized rosin. Upon heat treatment at 280° C. for 12 minutes using a $CO_2$ sparge, there was obtained a product having an acid number of 151, a melting point of 111° C., a color of WG, and a sulfur content of 0.004%.

*Example 25*

The product of Example 24 was hydrogenated exactly as in Example 23. The product had an acid number of 147, a melting point of 116° C., a color of F+, and the hydrogen absorbed was 0.95%.

*Example 26*

To a solution of 1200 parts of K wood rosin in 1500 parts of benzene was added 300 parts of 95% $H_2SO_4$ over ½ hour with agitation at 12–18° C. Agitation was continued at this temperature for 5 minutes. The reaction mixture was diluted with 2500 parts of benzene, allowed to stand for several minutes, and the benzene solution decanted from the sludge.

To 1000 parts of the benzene solution there was added 900 parts of aqueous 40% $H_2SO_4$. The mixture was agitated for 1.5 hours at 80–90° C. under reflux. The aqueous acid was separated and the benzene solution given four consecutive washes with 1000 part portions of water at 25–30° C. Solvent was evaporated as previously. The product had an acid number of 164, a melting point of 106° C., a color of M, and a sulfur content of 0.009%.

*Example 27*

The product of Example 26 was hydrogenated as in Example 2 but for ½ hour and with a hydrogen pressure range of 46–58 lbs. The hydrogenation was conducted by dividing the product to be hydrogenated into six lots, and using the same catalyst consecutively for six runs. The absorptions of hydrogen were 0.61%, 0.51%, 0.54%, 0.54%, 0.49%, and 0.48%, in order. The product had a color of K.

*Example 28*

The remainder of the benzene solution in Example 26 was washed directly with water and the solvent evaporated as previously. The product had an acid number of 165, a melting point of 108, a color of M and a sulfur content of 0.046%.

This product was hydrogenated as in Example 27. The hydrogen absorptions were 0.59%, 0.55%, 0.53%, 0.51%, 0.47%, and 0.47%, in order. The product had a color of K.

*Example 29*

A lot of commercially available sulfuric acid polymerized rosin which had an acid number of .154, a melting point of 99–100° C., a color of M and a sulfur content of 0.008% was hydrogenated using glacial acetic acid as solvent with platinum as a catalyst, and in the same manner as in Example 2 except for ½ hour and with a hydrogen pressure range of 45–55 lbs. The hydrogenation was carried out on six consecutive batches using the same catalyst over and over as in the last two examples. The product had a color of K. The hydrogen absorptions were 0.63%, 0.52%, 0.42%, 0.21%, 0.19%, and 0.14%, in order. The gradual reduction in hydrogen absorption was caused by the presence of lead in the polymerized rosin being hydrogenated, to the extent of about 0.3 parts per million. This trace of lead poisoned the hydrogenation catalyst cumulatively.

*Example 30*

One hundred parts of sulfuric acid polymerized rosin which had been bleached with zinc and sodium bisulfate and then heat treated at 250–260° C. for 10 minutes under $CO_2$, was dissolved in 200 parts of methanol. Thirty parts of methanol wet Raney nickel catalyst were added and the mixture subjected to hydrogenation in a chrome steel bomb at 148–159° C. for 3.5 hours at a hydrogen pressure of 1700–2000 lbs. per square inch. The hydrogen absorption was 0.6%. The catalyst was filtered off and the solvent evaporated in vacuo. The characteristics of the original and the final materials were as follows:

| | Original material | Hydrogenated material |
|---|---|---|
| Acid number | 163 | 158 |
| Melting point °C | 88 | 85.5 |
| Color | N+ | Dark |
| $(SCN)_2$ value | 84.5 | 50 |
| Refractive index | 1.5449 | 1.5388 |

*Example 31*

Fifty parts of the same polymerized rosin as was used in Example 30 was dissolved in 150 parts of glacial acetic acid and hydrogenated in the presence of 16 parts of platinum oxide catalyst supported on Filter-Cel (10% metal) at a pressure of 24–41 lbs. per square inch at 29° C. for 2 hours. The catalyst was filtered off and the solvent evaporated by vacuo distillation. About 0.72% of hydrogen was absorbed. The product had an acid number of 165, a melting point of 87° C., a color of G, a refractive index of 1.5292, and an $(SCN)_2$ value of 29.

Examples 30 and 31 show that, unexpectedly, even though the starting material was only slightly polymerized, no improvement in extent of hydrogen absorption occurred.

*Example 32*

One hundred parts of boron trifluoride polymerized rosin was hydrogenated for one hour at 2550 lbs. per square inch maximum pressure and at 182° C. average temperature. One hundred parts of ethyl acetate was used as the solvent. The catalyst was 8 parts of a silica supported active nickel. The original material and the product had the following properties.

| | Polymerized rosin | Hydrogenated polymerized rosin |
|---|---|---|
| Acid number | 166 | 147 |
| Melting point °C | 104–108 | 84.5 |
| Refractive index | 1.542 | 1.535 |
| Color | 80A+11R | 23A |

The color of the material was greatly improved but the melting point and acid number lowering indicate some degradation as a result of the treatment. However, the product contained a substantial amount of hydrogenated rosin. The drop in refractive index indicates a reduction in the unsaturation brought about by the treatment.

*Example 33*

A lot of commercially available polymerized rosin sold under the name of "Nuroz" analyzing 0.001% of sulfur, acid number 160, melting point 105° C., and color M was hydrogenated in three steps using consecutively the same lot of platinum hydrogenation catalyst, using 50% di-isopropyl ether—50% glacial acetic acid as solvent, and using a hydrogen pressure of 40–60 lbs. at 26° C. The hydrogen absorbed was 0.67%, 0.63%, and 0.58%, in order. The product was more stable than the original material and had an acid number of 160 and a melting point of 108.5° C.

It will be understood that the details and examples hereinbefore set forth are illustrative only and that the invention as broadly described and claimed is in no way limited thereby.

This application is a division of my application, Serial No. 378,059, filed February 8, 1941.

What I claim and desire to protect by Letters Patent is:

1. As a stable rosin product of relatively high melting point, a hydrogenated polymerized rosin ester.

2. As a stable rosin product of relatively high melting point, a hydrogenated polymerized rosin polyhydric alcohol ester.

3. As a stable rosin product of relatively high melting point, hydrogenated polymerized rosin glycerine ester.

4. As a stable rosin product of relatively high melting point, a hydrogenated polymerized rosin monohydric alcohol ester.

5. As a stable rosin product of relatively high melting point, a hydrogenated dimer of a rosin acid ester.

6. The process which comprises polymerizing a rosin ester to form a polymerized rosin ester of increased melting point, and contacting the polymerized rosin ester with an active hydrogenation catalyst and hydrogen under pressure.

7. The process which comprises polymerizing a rosin ester to form a polymerized rosin ester of increased melting point, and contacting the polymerized rosin ester with an active base metal hydrogenation catalyst and hydrogen under a pressure within the range of from about 250 to about 5000 lbs. per square inch.

8. The method of producing a relatively high melting point rosin product which comprises polymerizing rosin, nuclearly hydrogenating the resulting polymerized rosin and esterifying the hydrogenated polymerized rosin with a polyhydric alcohol.

9. A relatively high melting stable polyhydric alcohol ester of a nuclearly hydrogenated polymerized rosin.

10. A relatively high melting stable glycerine ester of a nuclearly hydrogenated polymerized rosin.

11. A relatively high melting stable glycol ester of a nuclearly hydrogenated polymerized rosin.

12. A relatively high melting stable pentaerythritol ester of a nuclearly hydrogenated polymerized rosin.

13. As a stable rosin product of relatively high melting point, a hydrogenated polymerized rosin acid ester.

IRVIN W. HUMPHREY.